United States Patent
Zeng

(10) Patent No.: US 8,504,769 B2
(45) Date of Patent: Aug. 6, 2013

(54) COMPUTING DEVICE AND METHOD FOR IDENTIFYING HARD DISKS

(75) Inventor: Ge-Xin Zeng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 72 days.

(21) Appl. No.: 13/221,925

(22) Filed: Aug. 31, 2011

(65) Prior Publication Data
US 2012/0137068 A1    May 31, 2012

(30) Foreign Application Priority Data
Nov. 25, 2010 (CN) .......................... 2010 1 0558947

(51) Int. Cl.
*G06F 12/00* (2006.01)
(52) U.S. Cl.
USPC .............................................. 711/114; 710/8

(58) Field of Classification Search
USPC .............................................. 711/114; 710/8
See application file for complete search history.

(56) References Cited

U.S. PATENT DOCUMENTS

| | | | | |
|---|---|---|---|---|
| 5,608,901 A | * | 3/1997 | Letwin | .................................. 1/1 |
| 5,896,546 A | * | 4/1999 | Monahan et al. | ................ 710/10 |
| 6,195,732 B1 | * | 2/2001 | Adams et al. | .................. 711/156 |
| 6,438,663 B1 | * | 8/2002 | Agarwal et al. | ................ 711/148 |
| 2002/0194182 A1 | * | 12/2002 | Fujita et al. | ..................... 707/10 |
| 2010/0100699 A1 | * | 4/2010 | Caulkins | ........................ 711/171 |

* cited by examiner

*Primary Examiner* — Hashem Farrokh
(74) *Attorney, Agent, or Firm* — Altis Law Group, Inc.

(57) ABSTRACT

A method for identifying hard disks connected to one or more ports of a computing device. The computing device comprises a controller. A first serial-number of each of the hard disks read by the controller is received. A second serial-number corresponding to each drive letter of the hard disk assigned by an operating system of the computing device is read. The first serial-number and the second serial-number is compared to determine associations between the drive letters and the hard disks. The associations are displayed on a display device connected to the computing device.

6 Claims, 4 Drawing Sheets

COMPUTING DEVICE AND METHOD FOR IDENTIFYING HARD DISKS

BACKGROUND

1. Technical Field

Embodiments of the present disclosure generally relate to hard disk management, and more particularly to a computing device and a method for identifying hard disks connected to the computing device.

2. Description of Related Art

Usually, if more than one hard disk is connected to a computing device, it is difficult for users to identify associations of physical hard disks and drive letters assigned to the hard disks, such as "C", "D", and "E". When users want to store data into an appointed hard disk, or pull out an appointed hard disk, it is difficult to identify which hard disk belongs to which drive letter without the associations of the one or more hard disks and the drive letters being displayed on a display device.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
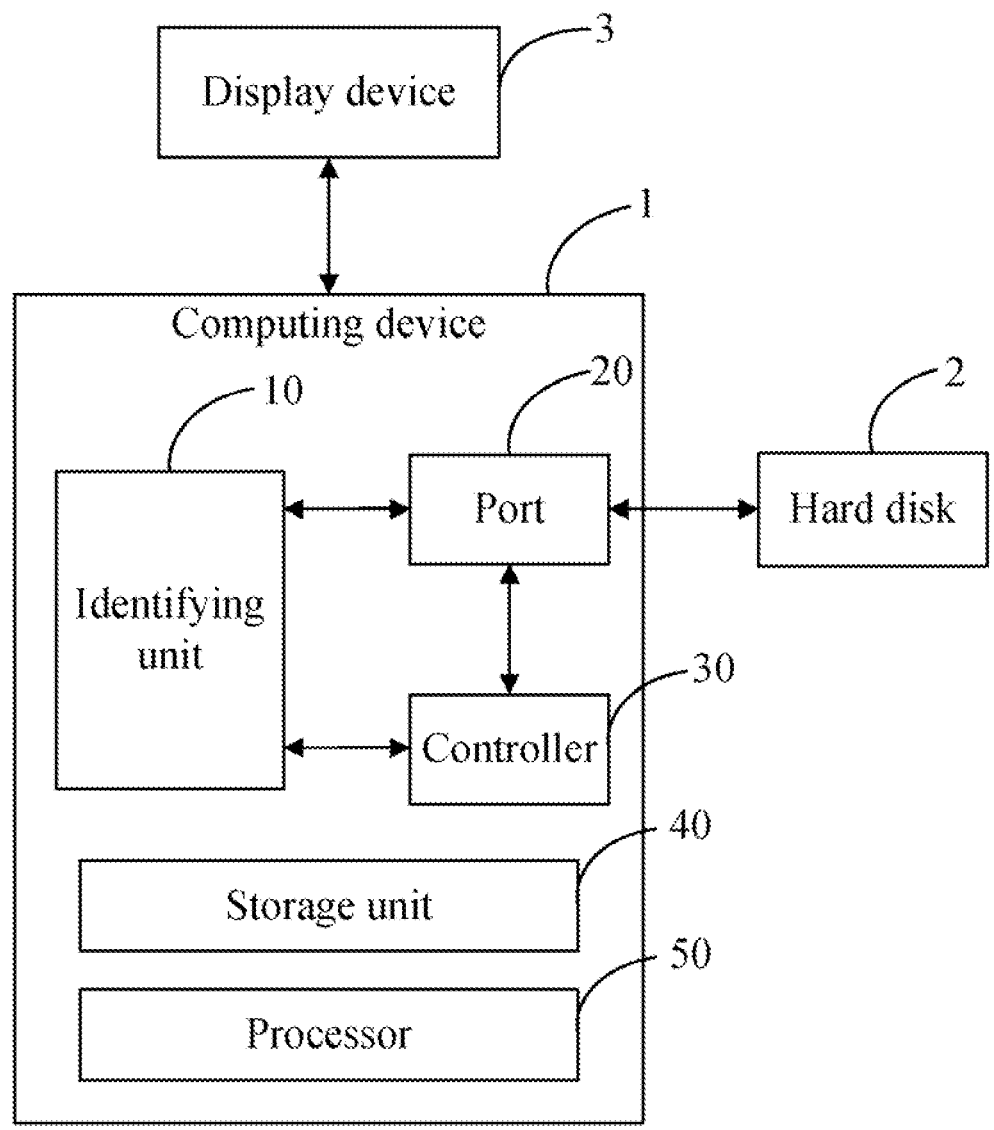
FIG. 1 is a block diagram of one embodiment of a computing device including an identifying unit for identifying hard disks connected to the computing device.

FIG. 1 is a block diagram of one embodiment of a computing device 1 including an identifying unit 10 for identifying hard disks 2 (hereinafter "the disk 2") connected to the computing device 1. The computing device 1 further includes at least one port 20 for each of the disks 2, a controller 30, a storage unit 40, and a processor 50. Each of the disks 2 can be electrically connected to the computing device 1 through a port 20. The computing device 1 further electrically connects to a display device 3.

The ports 20 are on a motherboard (not shown) of the computing device 1. Each of the one or more ports 20 may be labeled, such as "SATA1", "SATA2", and each of the disks 2 can be assigned a label corresponding to the port 20 that the disk 2 is connected to. For example, the disk 2 connected to "SATA1" can be assigned a label of "HDD1", and the disk 2 connected to "SATA2" can be assigned a label of "HDD2".

The controller 30 is used to control the disks 2 and read information about each of the disks 2 through the ports 20.

Figure 2:
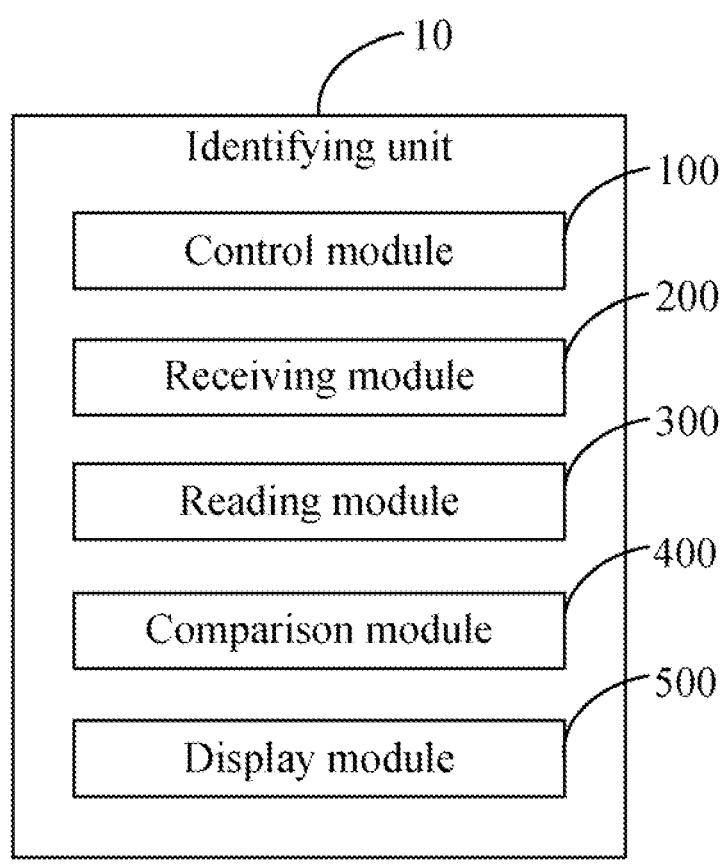
FIG. 2 is a block diagram of one embodiment of function modules of the identifying unit.

In one embodiment, the identifying unit 10 may include one or more function modules (detailed description is given in FIG. 2). The one or more function modules may comprise computerized code in the form of one or more programs that are stored in the storage unit 40, and executed by the processor 50 to provide the functions of the identifying unit 10 described later. The storage unit 40 may be a cache or a memory, such as an EPROM or a flash memory.

FIG. 2 is a block diagram of one embodiment of the function modules of the identifying unit 10. In one embodiment, the identifying unit 10 includes a control module 100, a receiving module 200, a reading module 300, a comparison module 400, and a display module 500.

The control module 100 is operable to control the controller 30 to read information about each of the disks 2. The information comprises a first serial-number of each of the disks 2. For example, the first serial-number of the disk 2 labeled "HDD1" can be "0000000000000001". The first serial-number of each of the disks 2 is unique. The controller 30 reads the first serial-number of each of the disks 2 through the corresponding ports 20, and then sends the first serial-numbers to the receiving module 200.

The receiving module 200 is operable to receive the first serial-numbers from the controller 30.

The reading module 300 is operable to read a drive letter of each of the disks 2 assigned by an operating system of the computing device 1, such as "C", "D", "E", "F", and read a second serial-number corresponding to the drive letter from the operating system.

The comparison module 400 is operable to compare the first serial-number of each of the disks 2 and the second serial-number corresponding to each drive letter, to determine associations between the drive letters and the disks 2. It is understood that each of the disks 2 may be associated with one or more drive letters. If the first serial-number of one disk 2 is the same as the second serial-number of one drive letter, the comparison module 400 determines the disk 2 is associated with that drive letter. For example, if the second serial-number of the drive letter "C" is "0000000000000001", which is the same as the first serial-number of the disk 2 labeled "HDD1", the comparison module 400 determines that "HDD1" is associated with the drive letter "C".

The display module 500 is operable to display the associations between the one or more disks 2 and the drive letters on the display device 3.

Figure 3:
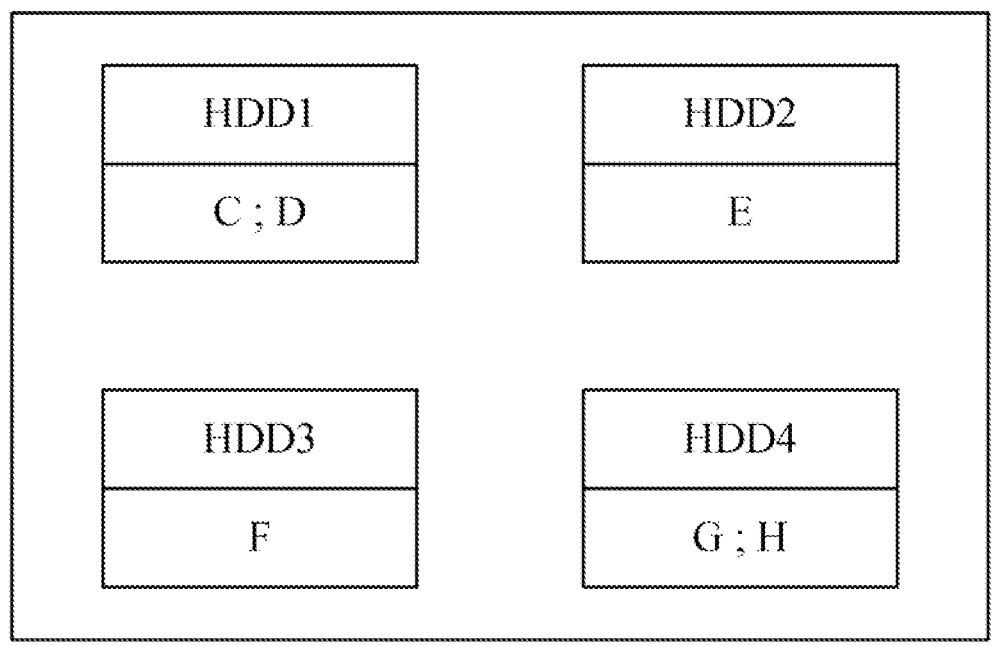
FIG. 3 is a block diagram of one embodiment of associations displayed on a display device connected to the computing device.

FIG. 3 is a block diagram of one embodiment of the associations displayed on the display device 3 connected to the computing device 1. In this embodiment, the disk 2 labeled "HDD1" is associated with the drive letters "C" and "D", meaning the disk 2 has been partitioned into two drives, the disk 2 labeled "HDD2" is associated with the drive letter "E", the disk 2 labeled "HDD3" is associated with the drive letter "F", and the disk 2 labeled "HDD4" is associated with the drive letters "G" and "H".

Figure 4:
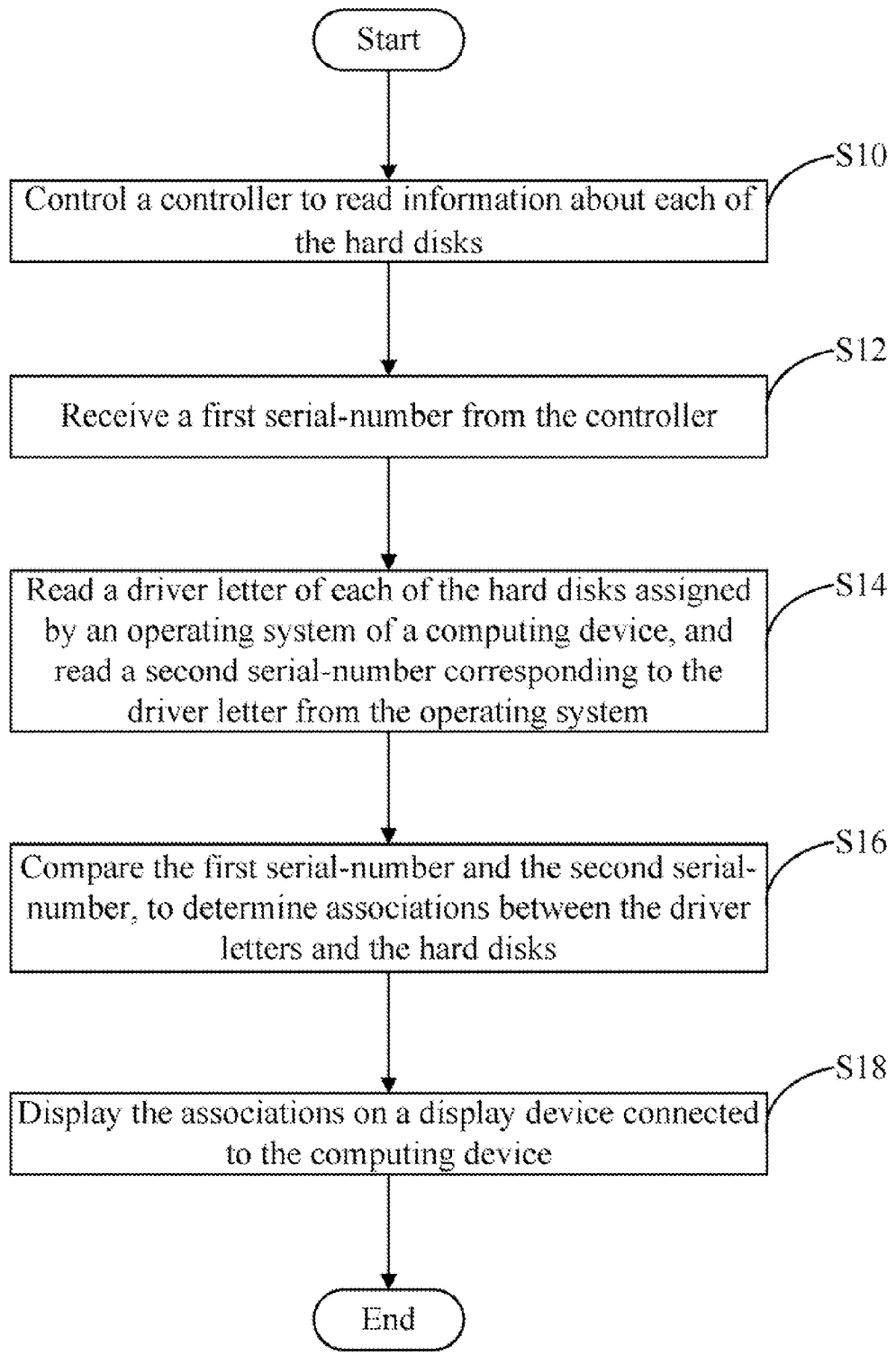
FIG. 4 is a flowchart of one embodiment of a method for identifying the hard disks connected to the computing device.

FIG. 4 is a flowchart of one embodiment of a method for identifying the disks 2 connected to the computing device 1. Depending on the embodiment, additional blocks may be added, others removed, and the ordering of the blocks may be changed.

In block S10, the control module 100 controls the controller 30 to read information about each of the disks 2. The information comprises a first serial-number of each of the disks 2. For example, the first serial-number of the disk 2 labeled "HDD1" can be "0000000000000001". The first serial-number of each of the disks 2 is unique. The controller 30 reads the first serial-number of each of the disks 2 through the corresponding ports 20, and then sends the first serial-numbers to the receiving module 200.

In block S12, the receiving module 200 receives the first serial-numbers from the controller 30.

In block S14, the reading module 300 reads a drive letter of each of the disks 2 assigned by an operating system of the computing device 1, such as "C", "D", "E", "F", and reads a second serial-number corresponding to the drive letter from the operating system.

In block S16, the comparison module 400 compares the first serial-number of each of the disks 2 and the second serial-number corresponding to each drive letter, to determine associations between the drive letters and the disks 2. It is understood that each of the disks 2 may be associated with one or more drive letters. If the first serial-number of one disk 2 is the same as the second serial-number of one drive letter, the comparison module 400 determines the disk 2 is associated with the drive letter. For example, if the second serial-number of the drive letter "C" is "0000000000000001", which is the same as the first serial-number of the disk 2 labeled "HDD1", the comparison module 400 determines that "HDD1" is associated with the drive letter "C".

In block S18, the display module 500 displays the associations between the one or more disks 2 and the drive letters on the display device 3.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A method for identifying hard disks connected to one or more ports of a computing device, the computing device comprising a controller, the method comprising:
    (a) controlling the controller to read information about each of the hard disks, the information comprising a first serial-number of each of the hard disks;
    (b) reading a drive letter of each of the hard disks assigned by an operating system of the computing device, and reading a second serial-number corresponding to the drive letter from the operating system;
    (c) comparing the first serial-number of each of the hard disks and the second serial-number corresponding to each drive letter, to determine associations between the drive letters and the hard disks; and
    (d) displaying the associations on a display device connected to the computing device.

2. The method as claimed in claim 1, wherein each of the hard disks is assigned a label corresponding to the port of the computing device that the hard disk is connected to.

3. A non-transitory storage medium storing a set of instructions, the set of instructions capable of being executed by a processor to perform a method for identifying hard disks connected to one or more ports of a computing device, the computing device comprising a controller, the method comprising:
    (a) controlling the controller to read information about each of the hard disks, the information comprising a first serial-number of each of the hard disks;
    (b) reading a drive letter of each of the hard disks assigned by an operating system of the computing device, and reading a second serial-number corresponding to the drive letter from the operating system;
    (c) comparing the first serial-number of each of the hard disks and the second serial-number corresponding to each drive letter, to determine associations between the drive letters and the hard disks; and
    (d) displaying the associations on a display device connected to the computing device.

4. The non-transitory storage medium as claimed in claim 3, wherein each of the hard disks is assigned a label corresponding to the port of the computing device that the hard disk is connected to.

5. A computing device, the computing device being connected to one or more hard disks via one or more ports, the computing device comprising:
    a storage unit;
    a controller;
    at least one processor; and
    one or more programs stored in the storage unit, executable by the at least one processor, the one or more programs comprising:
        a control module operable to control the controller to read information about each of the hard disks, the information comprising a first serial-number of each of the hard disks;
        a reading module operable to read a drive letter of each of the hard disks assigned by an operating system of the computing device, and read a second serial-number corresponding to the drive letter from the operating system;
        a comparison module operable to compare the first serial-number of each of the hard disks and the second serial-number corresponding to each drive letter, to determine associations between the drive letters and the hard disks; and
        a display module operable to display the associations on a display device connected to the computing device.

6. The computing device as claimed in claim 5, wherein each of the hard disks is assigned a label corresponding to the port of the computing device that the hard disk is connected to.

* * * * *